March 2, 1948.  P. KIRK  2,437,199

SEAT FOR USE IN AIRCRAFT

Filed Feb. 8, 1946

INVENTOR.
Philip Kirk
BY
Howson & Howson
Attorneys.

Patented Mar. 2, 1948

2,437,199

UNITED STATES PATENT OFFICE

2,437,199

SEAT FOR USE IN AIRCRAFT

Philip Kirk, Philadelphia, Pa.

Application February 8, 1946, Serial No. 646,380

7 Claims. (Cl. 155—77)

This invention relates to improvements in the construction of chairs, seats, etc., for occupants of vehicles operating at high velocities, and particularly to vehicles which are subject to sudden change in the direction of travel, such for example as airplanes.

Modern combat planes, for example, have attained speeds in excess of 500 M. P. H. and even higher speeds would seem to be probable in the very near future. Sustained velocities at such high speeds are relatively harmless, insofar as the occupants are concerned, as long as the plane travels approximately in a straight line, but as soon as the direction of flight is altered both the plane and its occupants are subjected to stresses of a high order.

Technical advances in recent years have increased the speed and stress tolerance of planes to such a point that in combat maneuvers, for example, and in dive bombing, etc., the planes will successfully withstand the tremendous structural strains to which the planes are subjected, while the pilot, beyond certain limits of speed acceleration, etc., suffers profound disturbance of circulation, vision and consciousness, which limits the military effectiveness of combat planes.

When, at high speed, the flight path of a plane is altered from a straight line, as in suddenly starting to climb or in pulling out of a dive, the lift of the wings produces a centripetal force at right angles to the long axis of the plane. Due to the law of inertia, the pilot's body is pressed into the pilot's seat of the plane by a centrifugal force of exactly the same magnitude. Thus a plane moving at a velocity of 300 M. P. H., in a curved path having a radius of 2700 feet, for example, exerts on its own structure and on the body and the organisms of the pilot a force of 2.2 G. The pilot's weight of 180 lbs., with a normal gravitational force of 1 G., then becomes 396 lbs., at 2.2 G., and all his body tissues and fluids become and remain heavy as long as such high velocity flight in a curved path continues.

A force equal to 7 G. would be developed by a plane traveling at a velocity of 300 M. P. H. in a turn with a radius of 850 feet and the pilot would then be pressed into the seat with a weight of 1260 lbs. Under these conditions the pilot's effective specific gravity would be higher than that of molten iron and the hydrostatic pressure of the blood in the blood vessels of the feet of an average sized pilot, in a normal sitting position, would be about 570 mm. of mercury, plus the existing pressure in the vascular system as produced by the action of the heart.

When the reactionary force resulting from an upward change of direction of travel while moving at a high rate of speed is exerted on the pilot from his head toward his feet, the first reaction he receives from the impact of the aircraft against the resistance of the air is one of intense bodily strain. The cranium feels extremely heavy and becomes more and more difficult to hold erect. The skin of the forehead, cheeks and eyelids feel tense. The cheeks are pulled downward and the lower jaw sags. The arms and legs feel intensely heavy and can be moved only with great effort. Respiration becomes difficult because of downward displacement of the diaphragm by the pull of the liver and the downward pressure on the heart and lungs. The anterior abdominal wall is pushed outward. Dimming of vision appears, followed rapidly by total loss of vision, called "blackout." Unconsciousness usually results.

When the reactionary force resulting from a sudden downward change of direction of travel is exerted on the occupant from the feet toward the head, the face feels highly congested. A throbbing pain is felt throughout the head. The eyes seem to protrude from their orbits, resulting in a visual disturbance called "seeing red" or "reddening out." Mental confusion, headaches, muscular incoordination, and a staggering gait may last from five minutes to eight hours after the experience.

The object of the present invention is to provide a support for an occupant of a vehicle capable of extremely high speeds and subject to sudden changes in the direction of travel, wherein the support, in the form of a seat, berth, couch, etc., will counteract the influences of such sudden changes of direction of motion and relieve the occupant of the deleterious effects thereof.

Figure 2:
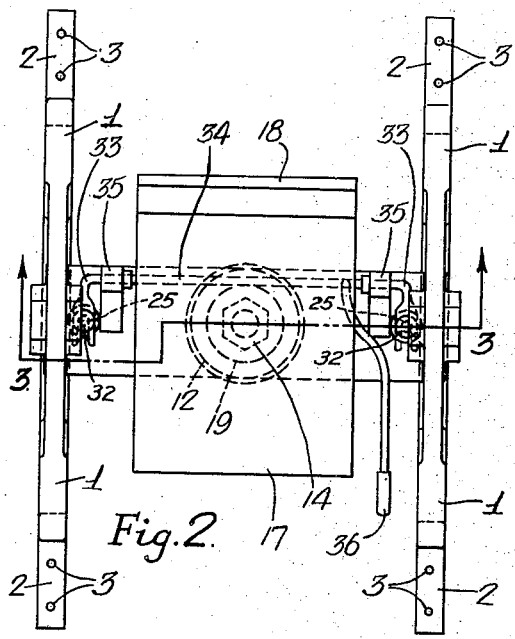
Fig. 2 is a plan view.
Figure 4:
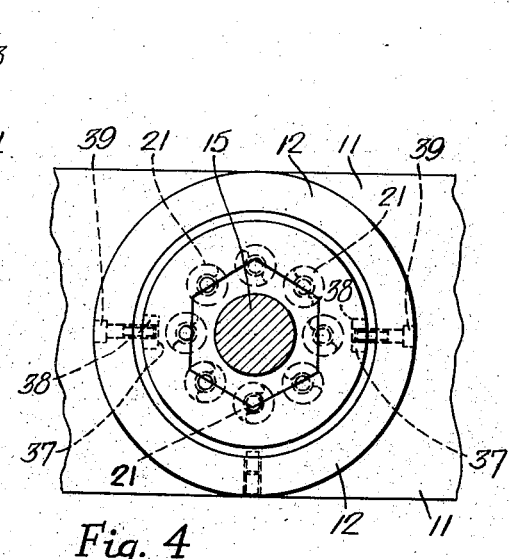
Fig. 4 is an enlarged sectional plan view taken on the line 4—4, Fig. 3.

The structure comprises a pair of parallel laterally spaced side frames or standards 1, 1, having feet 2, 2 provided with bolt holes 3 by which the entire structure may be rigidly secured in place in the vehicle in which the seat is to be installed. Each side frame 1 is provided with an upper or arm portion 5 in the central portion of which is mounted a horizontal pivot 6 for one arm 7 of a cradle 8.

Figures 1, 3:
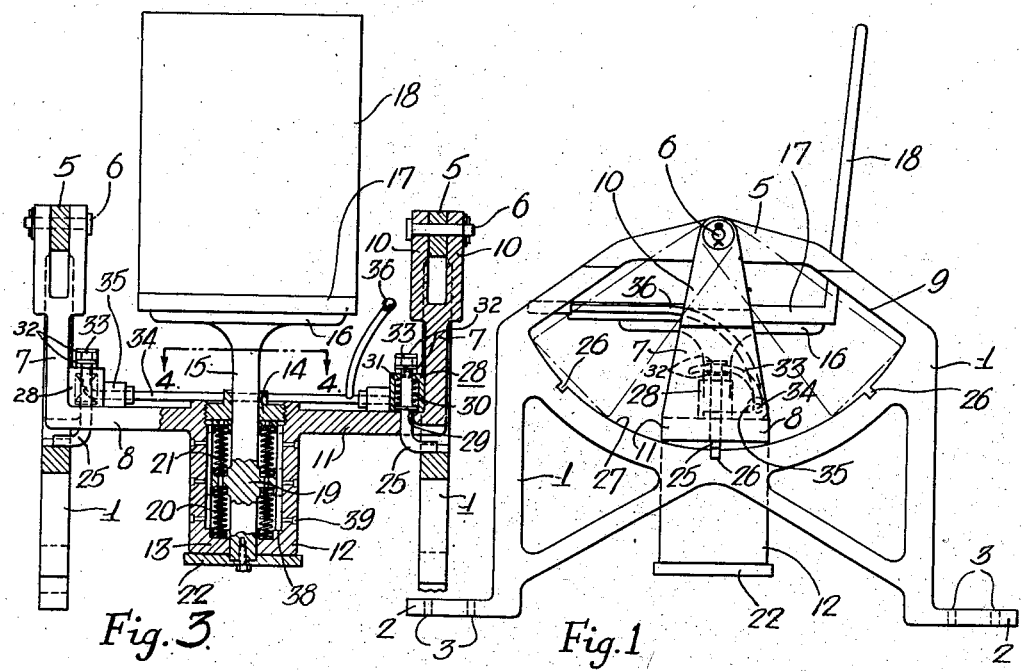
Fig. 1 is a side elevation of a seat constructed and adapted to operate in accordance with the principles of the present invention.
Fig. 3 is a transverse sectional elevation taken on the line 3—3, Fig. 2.

As shown in Fig. 3, each of the cradle arms 7 is located and adapted to swing in the plane of the frame 1, within a recess 9 formed therein. Each of the arms 7, 7 is forked at its upper end, as indicated at 10, with the upper portion 5 of the frame 1 disposed between and straddled by the fork arms 10, 10. The lower ends of the arms 7, 7 of the cradle 8 are connected by a transverse cross bar 11.

Formed integral with the cross bar 11, at the center thereof, intermediate the side arms 7, 7, is a cylinder 12. The cylinder 12 is provided with closure heads 13 and 14 which close the opposite ends of said cylinder and afford bearings for slidably supporting a post or pedestal 15 for vertical reciprocation with respect to the cross bar 11, within the cylinder 12 carried thereby.

The upper end of the pedestal 15 is provided with a plate or flange 16 on which the pilot's seat 17 is mounted, said seat having any desired kind of back rest 18.

Within the cylinder 12, between the heads 13 and 14 thereof, the pedestal 15 is provided with an annular circumferential enlargement 19, between which and the cylinder head 13 is mounted a plurality of compression springs 20, 20, by which the seat 17 is normally maintained at a predetermined elevation, vertically above the cross bar or beam 11 of the cradle 8.

Mounted in the cylinder 12, between the annular shoulder-forming enlargement 19 of the pedestal 15 and the cylinder head 14 of the cylinder 12 is a second series of compression springs 21, 21 which oppose the springs 20, 20, thereby maintaining the seat 17 resiliently in said normal position with respect to the cross beam 11 of the cradle 8.

Secured to the lower end of the pedestal 15, outside the cylinder 12 and lying adjacent the cylinder head 13 is a disc 22, which, when the seat 17 is unoccupied, may bear against the under side of the cylinder head 13 and limit the vertical movement upwardly of the pedestal 15 under the influence of the springs 20, 20.

Thus it will be seen that, when the seat 17 is occupied, in a plane which changes its course suddenly, to ascend for example from a horizontal or other straight line path in which the plane had been traveling, the weight of the occupant will be countered by the springs 20, 20; and the cradle 8 will swing on its pivots 6, 6 so that the axis of the pedestal 15 can automatically remain at or near the normal approximately vertical position when the sudden change in the direction of flight of the plane takes place.

Should it become desirable to lock the cradle firmly to the side frames 1, 1, in the normal approximately vertical position of the cradle 8 and the seat 17 as shown in full lines in Fig. 3, or in any other desired position within a maximum range of 90°, i. e. 45° to either side of the normal full line position of Fig. 1, as shown in broken lines therein, a pair of locking bolts 25, 25 are provided. These bolts are carried by the cradle 8, adjacent each of the arms 7, 7 thereof, and the outer ends of the bolts are adapted to be seated in locking notches 26, 26 formed in the arcuate surfaces 27, 27 of the recesses 9, 9 formed in the parallel flat side frames 1, 1 respectively.

Each bolt 25 is slidably mounted for radial movement with respect to the pivotal axis 6 of the cradle 8, in a housing 28 secured to the cross bar 11. Each bolt includes an annular shoulder 29 between which and the end wall 31 of the housing 28 is located a compression spring 30.

The opposite end of the bolt 25 projects beyond the end wall 31 of the housing 28 and is provided with a pair of spaced collars 32, 32, between which project a bifurcated end of a lever 33. The lever 33 is secured to a cross shaft 34 mounted in bearings 35, 35 secured to the cross bar 11 of the cradle 8 and the cross shaft is provided with an operating lever 36 which extends within reach of a person occupying the seat 17.

In order to prevent swiveling of the seat 17 about the axis of the pedestal 15, the annular enlargement 19 of said pedestal is grooved at 37 to slide on keys 38 secured on the inner surface of the cylinder 12 as by screws 39, 39.

I claim:

1. A seat structure comprising a pair of laterally spaced side frames, a cradle comprising a pair of side arms and a horizontal cross beam connecting said side arms, horizontal pivots mounted in said side frames for pivotally supporting said side arms thereon, a seat carried by said cradle and including a pedestal slidably mounted in said cross beam intermediate said side arms, and resilient means for normally supporting said seat in a predetermined position with respect to said cross beam.

2. A seat structure comprising a pair of laterally spaced side frames, a cradle comprising a pair of side arms and a horizontal cross beam connecting said side arms, horizontal pivots mounted in said side frames for pivotally supporting said side arms thereon, a seat carried by said cradle and including a pedestal slidably mounted in said cross beam intermediate said side arms, resilient means for normally supporting said seat in a predetermined position with respect to said cross beam, and means operable from said seat for locking said cradle to said side frames in any of a plurality of angular positions about the axes of said pivots.

3. A seat structure comprising a pair of laterally spaced side frames, a cradle comprising a pair of side arms, horizontal pivots mounted in said side frames for pivotally supporting said side arms thereon, a horizontal cross beam connecting said side arms remote to said pivots, a cylinder carried by said cross beam, intermediate said side arms, closure heads at the opposite ends of said cylinder, a seat including a pedestal slidably mounted in said closure heads, a circumferential enlargement on said pedestal intermediate said heads, and resilient means in said cylinder between said enlargement and said heads for normally supporting said seat in a predetermined position with respect to said cross beam.

4. A seat structure comprising a pair of laterally spaced side frames, a cradle comprising a pair of side arms operable in openings formed in said side frames in planes coincident with the planes of said side frames, forked ends on said side arms straddling portions of said side frames disposed above said openings, a horizontal cross beam connecting said side arms, horizontal pivots passing through said portions of said side frames and said straddling forked ends of said side arms for pivotally supporting said side arms in said side frames, a seat carried by said cradle and including a pedestal slidably mounted in said cross beam intermediate said side arms, and resilient means for normally supporting said seat in a predetermined position with respect to said cross beam.

5. A seat structure comprising a pair of laterally spaced side frames, a cradle comprising a pair of side arms operable in openings formed in said side frames in planes coincident with the planes of said side frames, forked ends on said side arms straddling portions of said side frames disposed above said openings, a horizontal cross beam connecting said side arms, horizontal pivots passing through said portions of said side frames and said straddling forked ends of said side arms for pivotally supporting said side arms in said side frames, a seat carried by said cradle and including a pedestal slidably mounted in said cross beam intermediate said side arms, resilient means for normally supporting said seat in a predetermined position with respect to said cross beam, and locking bolts slidably mounted in said cradle for cooperation with angularly spaced notches formed in the lower portions of said frame openings for securing said cradle in various angular positions with respect to said side frames.

6. A seat structure comprising a pair of laterally spaced side frames, a cradle comprising a pair of side arms operable in openings formed in said side frames in planes coincident with the planes of said side frames, forked ends on said side arms straddling portions of said side frames disposed above said openings, a horizontal cross beam connecting said side arms, horizontal pivots passing through said portions of said side frames and said straddling forked ends of said side arms for pivotally supporting said side arms in said side frames, a seat carried by said cradle and including a pedestal slidably mounted in said cross beam intermediate said side arms, resilient means for normally supporting said seat in a predetermined position with respect to said cross beam, and locking bolts slidably mounted in said cradle for cooperation with angularly spaced notches formed in the lower portions of said frame openings for securing said cradle in various angular positions with respect to said side frames and means operable from said seat for actuating said locking bolts.

7. A seat structure comprising a pair of laterally spaced side frames, a cradle comprising a pair of side arms and a horizontal cross beam connecting said side arms, horizontal pivots mounted in said side frames for pivotally supporting said side arms thereon, a cylinder carried by said cross beam intermediate said side arms, cylinder heads including bearings at the opposite ends respectively of said cylinder, a seat carried by said cradle and including a pedestal slidably mounted in said bearings, an annular enlargement on said pedestal within said cylinder between said bearings, and a plurality of compression springs in said cylinder between said annular enlargement and said cylinder heads for normally supporting said seat in a predetermined position with respect to said cross beam.

PHILIP KIRK.

REFERENCES CITED

The following references are of record in the file of this patent:

UNITED STATES PATENTS

| Number | Name | Date |
| --- | --- | --- |
| 87,933 | Holtz | Mar. 16, 1869 |
| 253,951 | Starr | Feb. 21, 1882 |
| 1,270,729 | Harris | June 25, 1918 |
| 1,688,587 | Liljedahl | Oct. 23, 1928 |